April 12, 1955     N. K. PETERS     2,705,864
ELECTRONIC CONTROL FOR GAS TURBINE ENGINES
Filed June 6, 1951     2 Sheets-Sheet 1
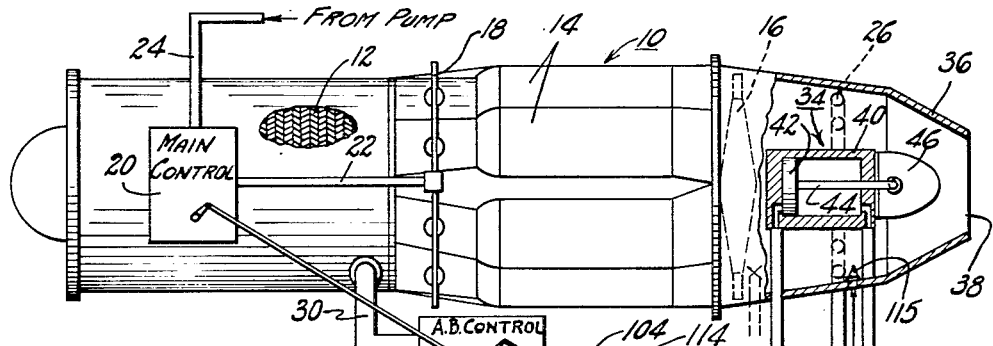
Fig.1
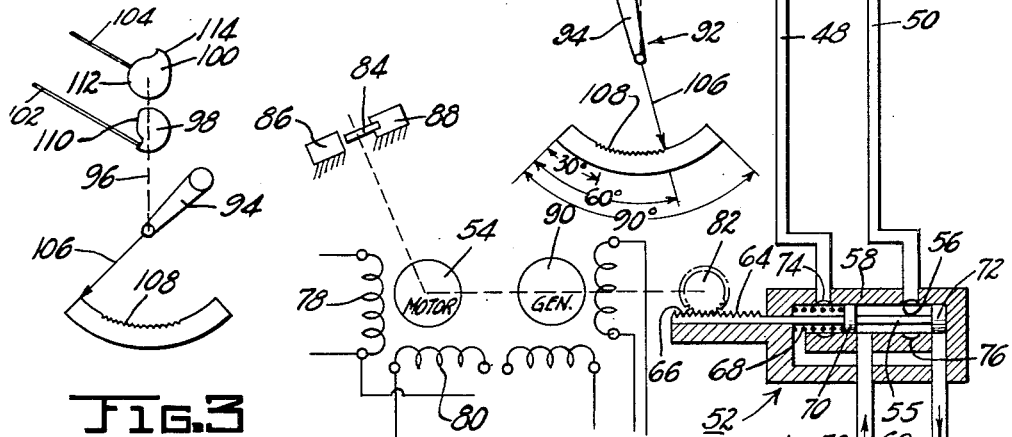
Fig.3
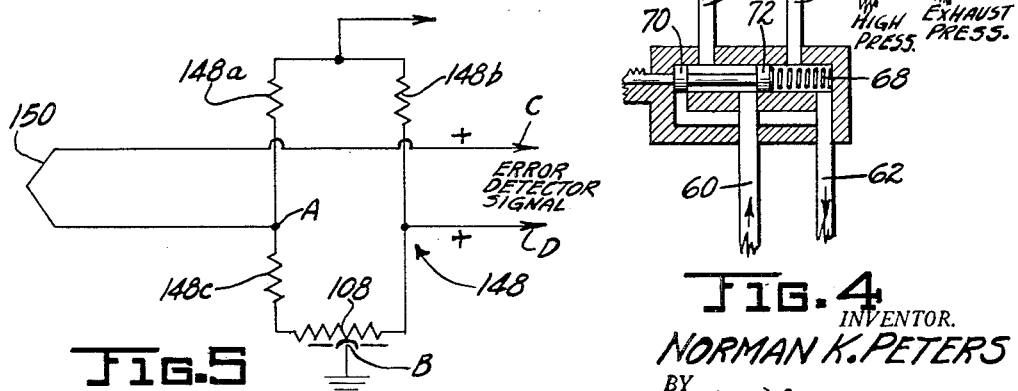
Fig.5
Fig.4
INVENTOR.
NORMAN K. PETERS
BY Cecil D. Arens
ATTORNEY

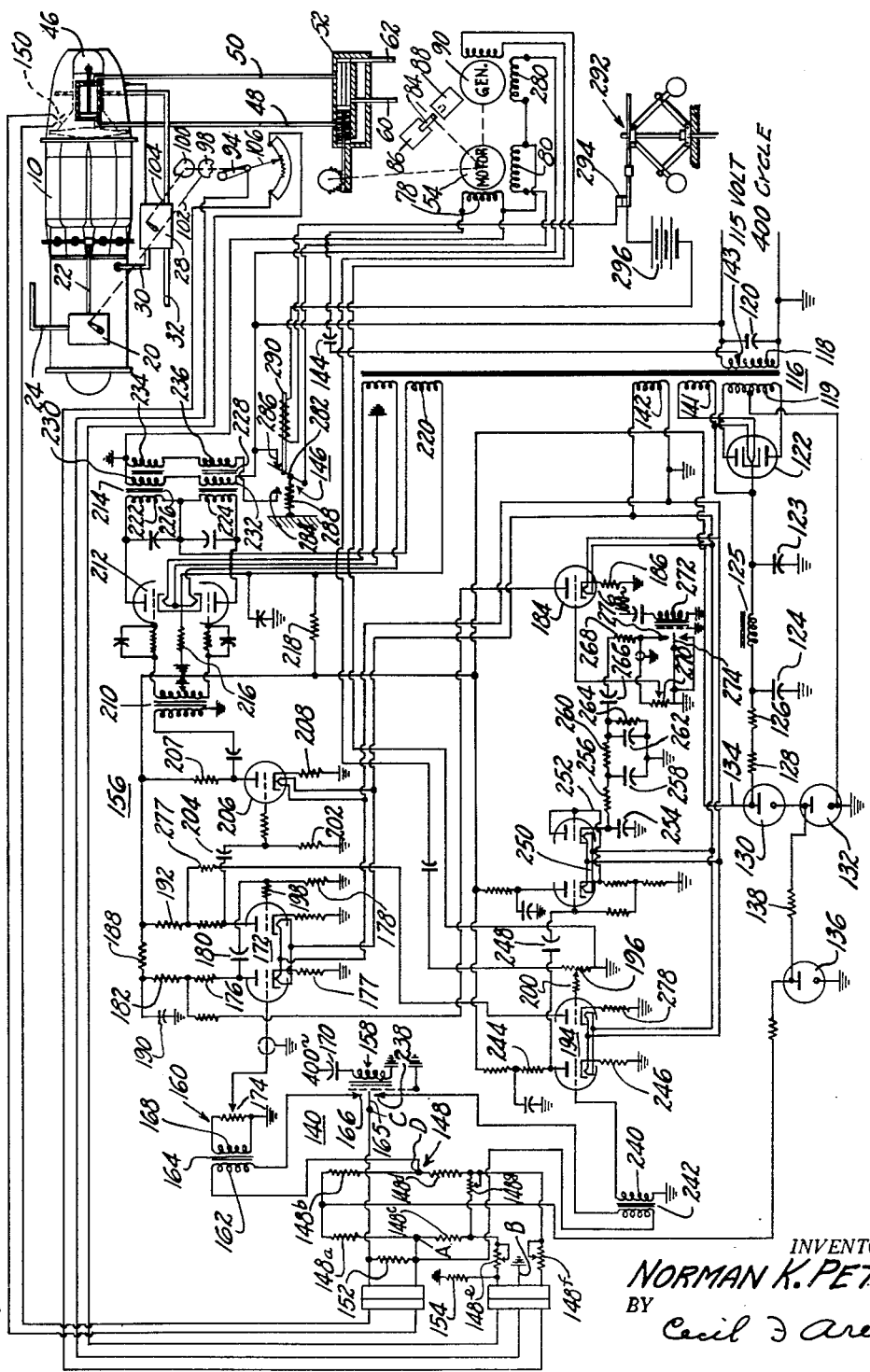

United States Patent Office 2,705,864
Patented Apr. 12, 1955

2,705,864

ELECTRONIC CONTROL FOR GAS TURBINE ENGINES

Norman K. Peters, South Bend, Ind., assignor to Bendix Aviation Corporation, South Bend, Ind., a corporation of Delaware Application June 6, 1951, Serial No. 230,097

18 Claims. (Cl. 60—35.6)

This invention concerns electronic control apparatus for jet engines.

The apparatus herein disclosed is shown in association with the fuel system of a gas turbine aircraft engine for which it was primarily designed but is not necessarily limited thereto. In gas turbine aircraft engines of the type embodying variable exhaust nozzles it has been found desirable to correlate exhaust area opening with throttle position beyond a specified engine speed, as fully explained in a copending joint application Serial Number 212,566, filed February 24, 1951, in my name and one Billy S. Hegg, now abandoned. In the joint application the electronic control per se is an element only of the entire combination and is claimed in the instant case in a slightly modified version. In the aforesaid joint application it is a function of the electronic amplifier to vary the exhaust nozzle area to prevent engine temperature from exceeding a predetermined safe value. It is in effect an electronic temperature sensing device capable of overriding the pilot's throttle signal for the exhaust nozzle area should engine temperature become excessive. However, in the instant application this novel electronic device will not only prevent engine temperature from exceeding a predetermined safe value but performs many other functions not before done electronically as will be hereinafter shown.

At the outset it will be well to bear in mind that the novel apparatus to be hereinafter disclosed is in the nature of an auxiliary control for use with the main engine control which will maintain the selected engine speed for all exhaust nozzle areas and flight conditions. This main engine control also has provisions for limiting fuel flow to amounts which will not produce excessive temperatures during acceleration.

One of the important objects of the invention resides in the provision of means for selecting optimum exhaust nozzle area for a given throttle setting.

Another important object of the invention resides in the provision of means capable of operating a jet engine at a point of maximum thrust per pound of fuel for a series of selected engine speeds.

A very important object of the invention resides in the provision of electronic apparatus capable of establishing an exhaust nozzle area which will provide maximum engine thrust per pound of fuel for engine speeds below maximum R. P. M.

A yet further important object of the invention resides in the provision of electronic apparatus for maintaining preselected engine temperatures at corresponding speeds below maximum rated engine temperature and capable of holding the engine at its rated temperature when the afterburner system is put into use.

A still further important object of the invention resides in the provision of means including electronic apparatus capable of controlling gas turbine engine speeds within a prescribed speed range of its maximum rated speed by preselecting temperatures corresponding to speeds below said rated speed.

An object of the invention is to provide electronic apparatus for controlling the exhaust nozzle area of a gas turbine engine by comparing two signals, one of which represents a desired engine temperature at which the engine is to be operated, and the other of which represents actual engine temperature.

One more important object of the invention resides in the provision of electronic apparatus for automatically maintaining engine temperature at a predetermined value when operating on the afterburner system.

The above and other objects and features of the invention will be apparent from the following description of the apparatus taken in connection with the accompanying drawings which form a part of this specification, and in which:

Figure 1 illustrates one form of gas turbine engine with which the apparatus of the invention is associated;

Figure 2 is a schematic circuit diagram of the novel apparatus;

Figure 3 illustrates the positions of the cams before rotation of the throttle;

Figure 4 exemplifies a modified form of pilot valve to be used in the control means for the mechanism; and Figure 5 is a simplified circuit diagram of the bridge.

Referring now to Figure 1 the reference numeral 10 designates a gas turbine engine comprising a compressor 12, burners 14, turbine 16, and main fuel manifold 18, connected to main fuel control 20, through a pipe line 22. A conduit 24 connects the main fuel control 20 to a fuel supply, not shown. Fuel to afterburner ports 26 is scheduled by an afterburner fuel control 28, having connections 30 and 32 to the compressor outlet and afterburner boost pump respectively, not shown. A mechanism 34 is located in the tail cone 36 of the engine for varying the effective area of opening 38. This mechanism is in the form of a hydraulic motor and comprises a cylinder 40, suitably supported adjacent to the opening or orifice 38, a piston 42, which divides the cylinder into opposed chambers, a piston rod 44, integrally related to the piston, and a conoid shaped member 46 carried at the end of the piston rod opposite the piston 42. The conoid member, which is sometimes called a bullet valve, is concentrically supported in the opening 38 for axial movement into and out of said opening for varying its effective area. Pipe lines 48 and 50 connect opposite ends of the cylinder to a fluid pressure source not shown.

Means is provided for controlling the mechanism 34, and includes a pilot valve 52 and electric motor 54. The pilot valve 52 is located in the lines 48 and 50 between the source, not shown, and the cylinder 40, for controlling the admission and exhaust of fluid from the latter. The pilot valve is equipped with a spool valve member 55 slidably positioned in a bore 56, of a housing 58. High pressure line 60, communicates with the center of the bore 56 in order to connect either of lines 48 and 50 with the high pressure side when the spool valve is shifted to the right or left as the case may be. The exhaust or low pressure line 62 communicates with the ends of the bore 56. One end of the spool valve member is provided with an extension 64, with which a rack 66 is integrally formed. A spring 68, located in one end of the bore 56, urges the spool valve to the right. This biasing action of the spring 68 is counterbalanced by the torque developed in the electric motor 54.

When the desired engine temperature (reference temperature) is just equal to the actual engine temperature the pilot valve spool is positioned so that lands 70 and 72 cover the annular grooves 74 and 76 respectively, thus cutting off communication to the opposite ends of the cylinder 40.

The motor 54, which is of the two phase type, is provided with a fixed phase winding 78 and a variable phase winding 80. The motor is drivably connected to the spool valve member 64 through a gear sector 82 carried on one end of the motor shaft and arranged in meshing relationship to the rack 66. The end of the motor shaft opposite the gear 82 carries an arm 84 which engages an overtemperature stop 86 when the motor is rotated in one direction and an undertemperature stop 88 when the motor is rotated in the opposite direction. These stops are disposed with respect to each other to allow substantially 360° rotation of the motor between stops. Proper gearing is introduced between the motor and pilot valve 52 to obtain the desired valve movement proportional to motor rotation.

An induction generator 90 is shown to be drivably connected to the motor 54 and generates an output signal having a magnitude and phase determined by the rate and direction of rotation of the driving motor. The purpose and function of this rate generator will be described later.

A manually settable device 92 is operatively connected to the fuel control equipment which includes the main fuel control and afterburner control, for selecting engine speed and desired engine operating temperature, and includes a throttle lever 94, secured to a shaft 96, on which cams 98 and 100 are mounted. The cams 98 and 100 are connected to the main fuel control 20 and to the afterburner fuel control 28 by linkages 102 and 104 respectively. A wiper arm 106 is secured to the lever 94 and rides on a resistor 108 for a purpose to be hereinafter described. The throttle lever 94 is capable of 90° rotation and functionally has three definite positions between 0 and 90 degrees. The first position, which is between 0 and 30 degrees might be termed the engine acceleration range. The engine is brought up to maximum speed in this range. The second position, which is between 30 and 60 degrees, is the range in which engine speed is held maximum and engine temperatures are selected above the initially selected temperature at maximum engine speed. The third position, which is between 60 and 90 degrees, is the afterburner range, in which maximum engine speed and temperature are held fixed and fuel supply scheduled by the afterburner control. With the throttle lever in the extreme right position, that is, at zero degrees rotation, the wiper arm 106 no longer rides on the resistor 108, and the cams 98 and 100 will be in the position shown in Figure 3, to thereby cut off fuel to the engine. Rotation of the throttle through its first position from zero to 30° operates the main fuel control only through cam 98 and linkage 102, thus selecting engine speeds. At the 30° position of the throttle maximum engine speed is attained. However, in the apparatus shown, at approximately 70% of maximum engine speed, the wiper arm 106 rides on the resistor 108 so as to select a desired engine operating temperature, which will be something less than the maximum desired engine operating temperature. The resistor 108 is calibrated so that when engine speed is selected in the 0 to 30 degree range a corresponding desired engine temperature is selected which is reflected as a voltage to be applied as hereinafter described. The selection of a desired engine temperature at engine speeds below maximum engine speed will cause the exhaust nozzle to assume an opening for the selected engine speed and temperature that will give the maximum pounds of thrust per pound of fuel. In other words by selecting a temperature for the selected speed, optimum exhaust nozzle opening is attained. The selection of desired engine operating temperatures below maximum desired engine temperature, before reaching maximum engine speed is a refinement that may or may not be desired depending on engine requirements. If the selection of engine operating temperatures before reaching maximum engine speed is not desired it may be deferred until maximum engine speed has been attained. This can be done by omitting that portion of the resistor which appears in the 0 to 30 degree throttle range. In its second position, between 30 to 60 degrees, the manually settable device no longer functions as a speed selecting device but selects engine temperatures only beyond that temperature which was initially selected to correspond to the maximum engine speed attained at the 30° throttle position. In moving the throttle from 30 to 60 degrees the wiper arm 106 in effect selects desired engine temperatures but actually produces a voltage which corresponds to a predetermined temperature. In its third position, between 60 and 90 degrees, the throttle lever actuates the afterburner fuel control through the cam 100 and linkage 104. In this latter position temperature is held constant by the automatic action of the mechanism 34. From 0 to 60 degrees on the throttle the linkage 102 rides on active cam face 110 of the cam 98, thus controlling fuel flow from the main fuel control as the throttle is rotated. During the 0 to 60 degree movement of the throttle it will be noted that linkage 104 rides on inactive face 112 of the cam 100. Between the 60 to 90 degree throttle position the linkage 104 rides on active face 114 of the cam 100 to thereby bring the afterburner fuel control into operation. A spark plug 115 is located downstream of the ports 26 for igniting the fuel supplied to the afterburner section. During the afterburner range the main fuel supply is furnishing maximum fuel to the engine.

The electric power supply for the electronic device to be hereinafter described includes a transformer 116 provided with a primary 118 connected to a 115 volt 400 cycle supply, not shown, and a high voltage secondary 119. A capacitor 120, connected across the primary, acts as a power factor corrector. The secondary 119 is connected to rectifier tube 122 in a full wave rectifier circuit, which changes the 400 cycle sine wave alternating current into a pulsating direct current. The pulsating direct current is smoothed by a low pass filter, which embraces condensers 123 and 124, and iron core inductor or choke, 125. Dropping resistors 126 and 128, and voltage regulator tubes 130 and 132 provide additional filtering action for the regulated direct voltage supply which appears across line 134 to ground. This regulated voltage aids in eliminating amplifier gain variations and its effect upon control stability which is detrimental where the amplifier supply voltage varies. Tube 136 and dropping resistor 138 are subjected to the regulated voltage which appears across the tube 132. The tube 136 is used as a voltage reference tube and is of the cold cathode, glow-discharge variety designed for excellent voltage stability with a negligible temperature coefficient. Thus characteristics of this tube are such as to provide the precise voltage supply to the bridge network 140.

Secondary windings 141 and 142 of the transformer 116 supply current to the heaters of the different tubes at the rated voltages. An electric circuit is provided for connecting the two phase servo-motor 54 directly to the primary of the power transformer 116 when engine speed is below a predetermined value. The fixed phase 78 is connected to a tap 143 on the power transformer 116. A condenser 144, in the fixed phase connection introduces a phase shift of 90° between the fixed and variable windings 78 and 80 to obtain maximum motor torque. The variable phase winding 80 is connected to the line of the power transformer 116 via a switch 146. The motor torque of this type motor is proportional to the product of the phase voltages and the sine of the phase angle between them.

The bridge network 140 includes a voltage reference bridge 148 provided with precision wire wound resistors 148a, 148b, 148c, 148d, 148e, 148f, 148g, and apparatus comprising a resistor 108 and the manually settable device 92. The bridge 148 is connected in parallel across the output voltage of the tube 136 to provide an accurate adjustable reference voltage for comparison with a voltage generated by thermocouple 150 and cold junction compensation. It will be noted that although the voltage established by the thermocouple is proportional to the difference between the hot and cold junction temperatures the output of the bridge is intended to be a function of the hot junction temperature only. This is accomplished with the use of resistor 148c which is constructed to vary its resistance with temperature so that the voltage from A to B is a function of the thermocouple cold junction temperature. As the cold junction temperature increases (reducing the temperature differential between the junctions), the voltage output of the thermocouple will decrease for a constant hot junction temperature, but to offset this decrease the voltage across the temperature compensating resistor 148c will increase enough to make the voltage from B to C independent of the cold function temperature. See circuit diagram of Figure 5, which is somewhat simpler than that of Figure 2 but illustrates the theory of circuit operation. An examination of Figure 5 discloses that the voltage established in the bridge from B to D is differentially connected with respect to the voltage from C to B. It will also be observed that the voltage from B to D represents a desired engine operating temperature and is selected by the throttle 94 which causes the wiper 106 to ride over the resistor 108. That is, selection of a voltage by the throttle, is in effect the same as selecting a temperature at which it is desired to operate the engine since the signal or voltage produced by a given setting of the throttle reflects a definite engine temperature. The resultant voltage of these differentially connected voltages, that is, the error voltage developed between points D and C in the bridge, has a magnitude proportional to the temperature difference between said temperatures and a polarity determined by the relative magnitudes of the temperatures. C is positive (+) with respect to D for thermocouple temperatures greater than the desired engine operating temperature and negative (—) for temperatures lower than the desired engine operating temperature. Throughout the specification and claims "temperature difference" is frequently used when referring to the actual and desired engine operating temperatures. However, it is to be understood that as a matter of fact "the desired engine temperature" does not exist as a "temperature" but only as a voltage. This language is nevertheless apt since the voltages do reflect temperatures, and whether real or fictitious is immaterial.

Resistors 152 and 154 have been added to the bridge for "safe failure." If, for example, the thermocouple circuit opens external to amplifier network 156, the resistor 152 which is connected across the thermocouple output and is of such a size as to normally have no effect on circuit operation, completes the bridge circuit and the equivalent of an under-temperature occurs. The resistor 154 simulates under-temperature operation should the wiper 106 on resistor 108 open.

The bridge network also includes a modulator 158 and an error detector 160 which together develop a square wave voltage having a magnitude proportional to the resultant or error signal which appears from C to D in the bridge and is in phase or 180 degrees out of phase with the 400 cycle supply depending upon the error voltage polarity. At engine temperatures above or below any given desired engine operating temperature current will flow in primary 162 of transformer 164 whenever movable member 165 contacts element 166. This member 165 is actuated at a frequency dependent upon the supply voltage, which is 400 cycles in this instance. Engine overtemperatures cause current flow up through the primary 162, and under-temperatures cause current to flow down through the primary 162, thus resulting in a signal phase reversal. In order to more clearly demonstrate the principle involved in the use of the modulator and detector it can be assumed that the modulator (whose function is to change a continuous direct current into a pulsating direct current) and transformer (whose function is to change a pulsating direct current into an alternating current) are connected to produce a signal in secondary 168 in phase with the 400 cycle supply voltage applied to the modulator for temperatures above a desired engine operating temperature, and a signal 180 degrees out of phase with said 400 cycle supply for under-temperatures. In order to compensate for the mechanical and inductive lag of the modulator a condenser 170 is placed in the 400 cycle supply to provide a leading current which will insure that the signal in the secondary 168 will be either in phase or 180 degrees out of phase with the supply voltage. The output signal from the bridge network, that is, the signal developed in the secondary 168, represents the resultant signal which appears from C to D in the bridge except that the former is alternating. Also, the signal in the secondary 168 has a magnitude proportional to the temperature difference between said temperatures and a polarity determined by the relative magnitudes of the temperatures.

The amplifier network 156 is connected between the bridge network 140, and the two phase motor 54, which is included in the control means for said mechanism 34.

The error signal which appears in the secondary 168 is connected to one of the grids of double tube 172. Potentiometer 174 provides for ready adjustment of the error signal amplification. The error signal is amplified by the left triode section of the tube 172 and its associated resistors 176 and 177. The amplified alternating current signal only appears across resistor 178 since the direct current is blocked by condenser 180. The error signal is modified by adding a temperature rate signal (this signal is produced by the thermocouple output without compensation for change in cold junction ambient) which has a magnitude substantially proportional to the rate of change of engine temperature and a polarity depending on whether engine temperature is increasing or decreasing. The output of this temperature rate circuit, which will be described in detail later, is combined with the error signal in resistor 182 which resistor is common to the left triode of the tube 172 and tube 184 of the temperature rate amplifier. The combined error and temperature rate signals are amplified in the network. The cathode resistors 177, of the tube 172, and 186 of the tube 184, are sufficiently large to provide individual stage degenerative feedback to permit tube interchangeability and as much as plus or minus 10% variation in heater voltages with negligible amplifier gain variation. Resistor 188 and condenser 190 comprise a decoupling filter network which reduces the power supply ripple across the tube 172 and 184 and minimizes the regenerative feedback from the output of the tubes.

The amplifier network is provided with a resistor 192 common to the right triode section of tube 172 and to the right triode section of a tube 194. The error signal and temperature rate signal which were combined in resistor 182 are added to the correction rate signal in resistor 192, and amplified in the network. The modified signal, produced from the combined error, temperature rate, and correction rate signals, appears across resistor 202 in a form of alternating current since condenser 204 blocks any direct current. A potentiometer 196 allows for adjustment of the correction rate signal magnitude. The circuit design permits this adjustment with a minimum effect on the amplification of the error and temperature rate signals. Resistors 198 and 200 associated with the right triode sections of tubes 172 and 194 respectively limit the grid current drawn during the positive going portion of large signals to prevent tube damage. The combined error, temperature rate, and correction rate signals are further amplified with the help of tube 206 and resistors 207 and 208, and then fed into the primary of push pull transformer 210. The output of tube 206 is capacitively coupled with the transformer 210. It is a function of the push pull transformer 210 to develop signals in the form of voltages on the grids of the upper and lower triode sections of reactor driving tube 212. These signal voltages are 180 degrees out of phase with each other.

In order to convert the low power signal voltage which appears in the secondary of the transformer 210 to a voltage with sufficient power to energize the variable phase winding 80 of the electric servo-motor 54, a phase sensitive circuit embracing the tube 212, and magnetic amplifier 214 are provided. A potential divider circuit including resistors 216 and 218 connect the regulated direct voltage supply to the grids of tube 212 to bias the tube. With an established bias, the signal voltage from the secondary of transformer 210 must reduce the negative signal voltage on the grid of tube 212 at the same instant the plate voltage is positive to produce or increase conduction in either triode section. If the temperature sensed by the tail pipe thermocouples, that is, actual engine temperature, is exactly equal to the desired engine operating temperature selected by the manually settable device, the amplifier network output will be zero, and the tube 212 will not conduct if the established bias is equal to or greater than the cut off bias of the tube. On the other hand if the established bias is less than the cut off bias of the tube (that is, more positive) both sections of the tube will conduct equal currents. In actual practice, however, there is an inherent electrical unbalance in the networks which is allowed to exist and is utilized to counterbalance the spring 68.

Secondary 220 of the transformer 116 supplies the plate voltages to the tube 212 of the phase sensitive circuit. If the phase of the current in the secondary 220 is such as to produce a positive plate voltage on the upper triode section of tube 212 at a time when the grid voltage of that section is going positive due to an over-temperature signal (actual engine temperature greater than the selected engine operating temperature) the upper section will conduct an average direct current through winding 222 of the magnetic amplifier 214, and during under-temperature conditions when the plate voltage on the lower triode section is positive at a time when the grid voltage of that section is going positive an average direct current will flow through winding 224 of the magnetic amplifier.

In addition to the control windings 222 and 224 the magnetic amplifier 114 which is shown schematically, includes two cores 226 and 228, primary windings 230 and 232 connected to the 115 volt supply, and secondary windings 234 and 236. The two secondary windings 234 and 236 are connected in series bucking to the variable phase 80 of the servo motor 54. With no direct current or equal currents in the control windings 222 and 224, the 115 volt supply is divided equally across the primary windings 230 and 232, with the secondary voltages canceling each other. Under these conditions no voltage appears across the variable phase winding 80. With an over-temperature condition in the engine, the conduction of an average direct current through the control winding 222, will tend to saturate the core which reduces the primary impedance of the transformer. Since the 115 volt supply across the primary windings is divided between them in direct proportion to their impedances, the secondary voltage developed in winding 236 will exceed the voltage developed in winding 234, with the voltage difference between these two windings being applied to the variable phase winding 80. Likewise an under-temperature condition in the engine will produce a control voltage 180 degrees out of phase with the voltage produced during the aforementioned over-temperature condition of the engine. This 180° shift of the control voltage causes a similar shift in the applied voltage to the variable phase winding 80, thus reversing motor torque.

The temperature rate circuit to be hereinafter described is designed to produce an alternating signal having an amplitude substantially proportional to the rate of change of engine temperature and a polarity depending upon whether engine temperature is increasing or decreasing. This signal is in phase or out of phase with the 400 cycle supply as determined by an increasing or decreasing rate of change of the temperature signal.

The input signal to this temperature rate circuit is obtained by modulating the thermocouple direct voltage which reflects actual engine temperature. The thermocouple direct voltage is changed to a pulsating direct voltage by the modulator 158 when movable member 165 is caused to contact element 238, thus setting up an induced alternating voltage in secondary 240 of transformer 242 which is connected to the grid of the left triode section of the tube 194. This alternating voltage is amplified by the left triode section of the tube 194 and its associated resistors 244 and 246. A blocking condenser 248 passes only the amplified alternating voltage to the cathode follower section of tube 250. The cathode follower section of this tube provides the required low impedance source for the rectifier section of the same tube at a signal level nearly equal to that in the high impedance amplifier circuit containing the tube 194. Attention is called to the fact that the grid and plate of the right triode section of the tube 250 are connected together electrically and to the cathode of the cathode follower section of the tube by a wire 252. The alternating signal which appears in wire 252 is rectified and filtered by a two section filter comprising a condenser 254, resistor 256, condenser 258, resistor 260, and condenser 262.

The filtered direct voltage which appears across resistor 264 will vary in magnitude in direct proportion to the engine temperature sensed. The aforesaid filtered direct voltage provides the input signal to a rate-sensitive circuit including condenser 266, and resistors 268 and 270. The output of the rate-sensitive circuit, which is approximately proportional to the rate of change in the direct voltage across resistor 264, is modulated by a chopper or modulator 272, which shorts out the resistor 270, at a line frequency of 400 cycles per second, by vibrating movable member 274 so that it contacts fixed element 276. This modulated signal is fed into the grid of the tube 184 and its associated resistors 182 and 186 where it is added to the error signal in the resistor 182 as aforementioned.

The rate generator 90 drivably connected to the motor 54, provides a 400 cycle correction rate signal which is fed into the amplifier network 156 via the right triode section of the tube 194 and its associated resistors 192, 277, and 278, wherein the correction rate signal is amplified and added to the error and temperature rate signal. Field winding 280 of the generator receives its excitation voltage from the 115 volt, 400 cycle supply. The generated voltage is directly proportional to the motor speed and its phase relationship to the excitation voltage is a function of the direction of motor rotation.

Feeding the correction rate signal into the amplifier network slows down the correcting action of the control means including said motor as the actual engine temperature approaches the selected engine operating temperature established by the bridge to thereby minimize control correction overshoot. This action of the correction rate signal is analogous to dashpot action in accomplishing control stability; both stabilize by reducing the control's correction speed without affecting control sensitivity or actuating forces under stall conditions.

Engine speed responsive means is provided for controlling the single pole double throw switch 146. This switch is equipped with a blade or movable contact 282 which engages either of fixed contacts 284 or 286, depending on whether the engine speed is above or below a predetermined value to thereby connect the amplifier network, or the circuit leading directly from the power supply to the motor 54. Movable contact 282 is biased toward the fixed contact 284 by a tension spring 288, thus normally connecting the electric motor to the amplifier network. An arming relay 290 disconnects the amplifier network from the motor and connects the latter to the power supply when energized. Energization of the relay 290 is controlled by an engine governor operated switching device 292 including a switch 294 which is closed when the engine speed is below a predetermined value and open when above said predetermined value. A battery 296 supplies electric energy to the relay 290. When the engine speed is above a predetermined value switch 294 is open and the relay 290 is deenergized, thus allowing the tension spring to move the contact 282 against the contact 284.

With the engine shut down or the power supply off, spring 68, located at the left end of the spool valve, will urge the spool to the right communicating the pipe line 50 and the right end of the cylinder 40 to the high pressure fluid. This moves the piston 42 and conoid member 46 to the left so as to provide a maximum effective exhaust opening. This represents an engine over-temperature condition. The windings of motor 54 are so connected, that with the power supply on and contact 282 resting against contact 286, the motor will rotate in a direction causing the spool valve to be moved to the right, as shown in Figure 1. The motor has rotated arm 84 against the over-temperature stop 86. This same action prevails so long as the engine speed is below a predetermined value. Under these conditions the motor supplements the action of the spring 68, urging the spool valve to the right for controlling the mechanism 34 in such a way as to maintain maximum exhaust nozzle opening when starting the engine and during periods below prescribed engine speeds. This will act as a safety valve to prevent burning out the engine.

When the engine speed is above a predetermined value relay 290 is deenergized and the spring 288 rotates the contact 282 against the contact 284 thereby connecting the motor 54 to the amplifier network.

As shown in Figure 4 the spring 68 may be located at the right end of the spool valve 54 so as to connect the left end of the cylinder 40 to high pressure fluid in the event of electric power failure, thus moving the cone to a position of minimum exhaust nozzle opening. If, as shown, in the modified form, the exhaust nozzle opening is caused to assume a minimum opening as a result of electric power failure, maximum engine thrust would be assumed during take off, for example.

Operation of the electronic tail gate control is as follows:

If we assume the throttle 94 to have been rotated from its off position to a position somewhere between 1 and 30 degrees, 15 degrees for example, which as aforementioned, is the first position of the throttle, the exhaust nozzle opening will have its maximum effective area since the control means for the mechanism will be connected to the power supply in such a manner as to aid the spring 68, see Figures 1 and 2, in urging the pilot valve to the right, to thereby connect the right end of the cylinder 40 to the high pressure line.

Continued movement of the throttle from the 15 degree position selectively increases the engine speed. At about 70 or 80 per cent of engine speed, depending on the setting of the switching device 292, the relay 290 is deenergized, thus allowing the switch 146 to connect the motor 54 to the amplifier network to permit the selection of engine speed and temperature up to the 30 degree throttling position, at which time maximum engine speed is attained. Each new throttle position thereafter up to 30 degrees rotation will select a temperature which will cause the optimum exhaust nozzle opening for that speed. That is, a tail gate opening will be provided where maximum pounds of thrust per pound of fuel is obtained at the selected engine speed.

In the second position of the throttle, which is from 31 to 60 degrees, the pilot is selecting engine temperatures only by selecting a voltage on the potentiometer 108 which is fed into the bridge network. Each selected voltage corresponds to a temperature at which it is desired to operate the engine. This selected temperature, in the form of a voltage, is compared in the bridge network with the actual engine temperature, which is in the form of a voltage from the thermocouple. The output of this bridge network is connected to the motor 54 via the amplifier network to thereby position the conoid member to obtain the engine temperature desired. When an electrical balance in the bridge network is reached (allowing for a slight unbalance to offset the action of the spring 68), that is, when actual engine temperature is equal to the desired engine temperature (reference temperature) the lands of the pilot valve will cover the annular grooves 74 and 76. For a given desired engine operating temperature the bridge network will pick up temperature deviations in either direction from the desired temperature and feed this deviation into the control means for automatically controlling the exhaust nozzle opening to maintain the selected temperature. At the 60 degree throttle position the engine is operating at its rated temperature, and the exhaust nozzle opening is a minimum for that operating temperature. Because of the contour of the cams 98 and 100 rotation of the throttle between 0 to 60 degrees controls only the main fuel control.

Rotation of the throttle to its third position, that is beyond 60 degrees, actuates the afterburner fuel control. During the afterburner period, from 61 to 90 degree throttle position, throttle movement schedules fuel only. The engine is held at rated temperature during this period by automatically varying the exhaust nozzle opening.

Although the invention has been described in connection with certain specific embodiments, the principles are susceptible of numerous other applications that will readily occur to persons skilled in the art.

Having thus described the various features of the invention, what I claim as new and desire to secure by Letters Patent is:

1. In a fuel feed and power control system for a gas turbine engine having an exhaust opening, a mechanism for varying the effective area of said opening, a control means connected to said mechanism and responsive to an engine temperature condition for adjusting said mechanism to maintain the engine at a predetermined temperature, a main fuel control device, an afterburner fuel device, and an apparatus connected to said devices and to said control means including manual means operable over a first range of movement for preselecting engine speed, operable over a second range of movement for selecting a predetermined engine temperature, and operable over a third range of movement for scheduling fuel to said afterburner device.

2. The combination with a gas turbine engine provided with fuel control equipment and an exhaust opening, of a mechanism for varying the effective area of said opening, means for controlling said mechanism including an electric motor, a bridge network comprising apparatus for establishing a voltage in the network which reflects a desired engine operating temperature, means for establishing a voltage in the network which reflects actual engine temperature, said voltages being fed into said network in such a relationship as to produce a resultant voltage having a magnitude proportional to the temperature difference between said temperatures and a polarity determined by the relative magnitudes of the temperatures, said bridge network apparatus embracing a manually settable device connected to said fuel control equipment for selecting engine speed and desired engine operating temperature, an amplifier network connecting said bridge network to said motor, and engine speed responsive means for disconnecting said amplifier from said motor at engine speeds below a predetermined value.

3. The combination according to claim 2 wherein means is provided for supplying said amplifier network with a voltage for modifying said resultant voltage including a circuit capable of creating a voltage having a magnitude substantially proportional to the rate of change of engine temperature and a polarity depending on whether engine temperature is increasing or decreasing.

4. The combination with a gas turbine engine provided with fuel control equipment and an exhaust opening, of a mechanism for varying the effective area of said opening, means for controlling said mechanism including an electric motor, a bridge network comprising apparatus for establishing a voltage in the network which reflects a desired engine operating temperature, means for establishing a voltage in the network which reflects actual engine temperature, said voltages being fed into said network in such a relationship as to produce a resultant voltage having a magnitude proportional to the temperature difference between said temperatures and a polarity determined by the relative magnitudes of the temperatures, said bridge network apparatus embracing a manually settable device connected to said fuel control equipment for selecting engine speed and desired engine operating temperature, an amplifier network connecting said bridge network to said motor, an electrical circuit connectible to said motor to cause said mechanism to maintain said opening at its maximum effective area, and engine speed responsive means for disconnecting said amplifier network from said motor at engine speeds below a predetermined value and for connecting said circuit to said motor.

5. The combination according to claim 4 wherein means is provided for supplying said amplifier network with a voltage for modifying said resultant voltage including a device connected to said motor for creating a voltage whose magnitude and phase are determined by the rate and direction of rotation of said motor, and means for supplying a voltage to said amplifier network for further modifying said resultant voltage comprising a circuit for creating a voltage having a magnitude substantially proportional to the rate of change of engine temperature and a polarity depending on whether engine temperature is increasing or decreasing.

6. The combination with a gas turbine engine equipped with an exhaust opening, of a mechanism for varying the effective area of said opening, means for controlling said mechanism including a device sensitive to an electrical signal, means for creating one electrical signal which reflects actual engine temperature and another electrical signal which reflects a desired engine operating temperature, means for deriving a resultant electrical signal from the aforesaid signals having a magnitude proportional to the temperature difference between said temperatures and a polarity determined by the relative magnitudes of the temperatures, an amplifying network connecting said last named means to said first named means, and means connected to said network for modifying said resultant signal including apparatus capable of establishing a signal with a magnitude substantially proportional to the rate of change of engine temperature and having a polarity depending on whether engine temperature is increasing or decreasing.

7. The combination with a gas turbine engine equipped with an exhaust opening, of a mechanism for varying the effective area of said opening, means for controlling said mechanism including a device sensitive to an electrical signal, means for producing two electrical signals representing actual and desired engine temperatures, means for deriving a resultant electrical signal from the aforesaid two signals having a magnitude proportional to the temperature difference between said temperatures and a polarity determined by the relative magnitudes of the temperatures, an amplifying network connecting said last named means to said first named means, and engine speed responsive means for disconnecting said network from said first named means at engine speeds below a predetermined value.

8. The combination with a gas turbine engine equipped with an exhaust opening, of a mechanism for varying the effective area of said opening, means for controlling said mechanism including a device sensitive to an electrical signal, means for producing two electrical signals representing actual and desired engine temperatures, means for deriving a resultant electrical signal from the aforesaid two signals having a magnitude proportional to the temperature difference between said temperatures and a polarity determined by the relative magnitudes of the temperatures, an amplifying network connecting said last named means to said first named means, an electrical circuit connected to said first named means for actuating said mechanism to establish maximum effective exhaust area opening, and engine speed responsive means for connecting said first named means to said circuit when engine speed is below a predetermined value and for disconnecting said circuit from said first named means and connecting said first named means to said network when engine speed is above said predetermined value.

9. The combination with a gas turbine engine equipped with an exhaust opening, of a mechanism for varying the effective area of said opening, means for controlling said mechanism including a device sensitive to an electrical signal, means for producing two electrical signals which reflect actual and desired engine temperatures respectively, means for deriving a resultant electrical signal from the aforesaid two signals having a magnitude proportional to the temperature difference between said temperatures and a polarity determined by the relative magnitudes of the temperatures, an amplifying network connecting said last named means to said first named means, means connected to said network for modifying said resultant signal including apparatus capable of producing a signal having a magnitude substantially proportional to the rate of change of engine temperature and a polarity depending on whether engine temperature is increasing or decreasing, and engine speed responsive means for disconnecting said network from said first named means at engine speeds below a predetermined value.

10. The combination with a gas turbine engine equipped with an exhaust opening, of a mechanism for varying the effective area of said opening, means for controlling said mechanism including a device sensitive to an electrical signal, means for producing two electrical signals which reflect actual and desired engine temperatures respectively, said second named means being provided with a device for manually selecting the desired engine temperature, means for deriving a resultant electrical signal from the aforesaid two signals having a magnitude proportional to the temperature difference between said temperatures and a polarity determined by the relative magnitudes of the temperatures, an amplifying network connecting said last named means to said first named means, means connected to said network for modifying said resultant signal including apparatus capable of producing a signal having a magnitude substantially proportional to the rate of change of engine temperature and a polarity depending on whether engine temperature is increasing or decreasing, an electrical circuit connected to said first named means for actuating said mechanism to establish maximum effective exhaust area opening, and engine speed responsive means for connecting said first named means to said circuit when engine speed is below a predetermined value and for disconnecting said circuit from said first named means and connecting said first named means to said network when engine speed is above said predetermined value.

11. The combination with a gas turbine engine equipped with an exhaust opening, of a mechanism for varying the effective area of said opening, means for controlling said mechanism including an electric motor, means for producing a signal which reflects actual engine temperature, means for producing a signal which reflects a desired engine operating temperature including a manually settable device for preselecting the desired engine operating temperature, means for deriving a resultant signal from said signals having a magnitude proportional to the temperature difference between said temperatures and a polarity determined by the relative magnitudes of the temperatures, an amplifying network connecting said last named means to said first named means, means connected to said network for modifying said resultant signal including a device for creating a signal having its magnitude and phase dependent upon the rate of rotation and direction of said motor, and engine speed responsive means for disconnecting said network from said first named means at engine speeds below a predetermined value.

12. A system for controlling temperature in an aircraft engine equipped with a variable area exhaust nozzle mechanism comprising means for creating a signal representing a desired engine operating temperature, means for creating a signal representing actual engine temperature, means for deriving a resultant signal from said signals having a magnitude proportional to the difference between actual and desired engine temperatures and having a polarity which is determined by the relative magnitudes of the aforesaid temperatures, means responsive to said resultant signal operatively associated with said mechanism and including an electric motor, and means for modifying said resultant signal including a device for producing a signal having its magnitude and phase dependent upon the rate and direction of rotation of said motor.

13. A system for controlling temperature in an aircraft engine equipped with a variable area exhaust nozzle mechanism comprising means for creating a signal representing a desired engine operating temperature, means for creating a signal representing actual engine temperature, means for producing a resultant signal from said signals having a magnitude proportional to the difference between actual and desired engine temperatures and having a polarity which is determined by the relative magnitudes of the aforesaid temperatures, means responsive to said resultant signal operatively associated with said mechanism and including an electric motor, means for modifying said resultant signal including a device for producing a signal having its magnitude and phase dependent upon the rate and direction of rotation of said motor, and additional means for modifying said resultant signal including apparatus for producing a signal with a magnitude substantially proportional to the rate of change of engine temperature and having a polarity dependent upon whether engine temperature is increasing or decreasing.

14. The combination with a gas turbine engine having an exhaust opening and fuel control equipment, of a mechanism for varying the effective area of said opening, means for controlling said mechanism including an electric motor, a bridge network comprising apparatus for producing a voltage in the network which reflects a desired engine operating temperature, means for establishing a voltage in the network which reflects actual engine temperature, said voltages being differentially connected so that the resultant voltage output of the network will have a magnitude proportional to the temperature difference between said temperatures and a polarity determined by the relative magnitudes of the temperatures, said bridge network apparatus embracing a manually settable device connected to said fuel control equipment for selecting engine speed and desired engine temperature when in one position, and for maintaining said selected engine speed and selecting another desired engine temperature when moved to a second position, and an amplifier network connecting said bridge network to said motor.

15. The combination according to claim 14 wherein said manually settable device schedules fuel flow and maintains said selected engine speed and said last mentioned desired engine temperature when moved to a third position.

16. The combination with a gas turbine engine having an exhaust opening and provided with a main fuel control system and an afterburner control system, of a mechanism for varying the effective area of said opening, means for controlling said mechanism, a bridge network comprising apparatus for producing a voltage in the network which reflects desired engine operating temperature, means for producing a voltage in the network which reflects actual engine temperature, said voltages being differentially connected so that the resultant voltage output of the bridge network will have a magnitude proportional to the temperature difference between said temperatures and a polarity determined by the relative magnitudes of the temperatures, said bridge network apparatus embracing a manually settable device connected to said main fuel control and to said afterburner control and having three positions, in its first position said device is operatively connected to said main fuel control for selecting engine speed and is ineffective to operate said afterburner fuel control or establish a voltage in said bridge network, in its second position said device is ineffective to operate said afterburner control but is operatively connected to main fuel control and selects a desired engine temperature which establishes a voltage in said bridge network corresponding to the selected temperature, in its third position said device is operatively connected to said afterburner control for scheduling fuel and for maintaining the engine temperature and speed at the maximum values selected in its second position, an amplifier network connecting said bridge network to said first named means, a circuit connectible to said first named means for maintaining said opening at a maximum effective area, and engine speed responsive means for disconnecting said amplifier network from and for connecting said circuit to said first named means when said manually settable device is in its first position.

17. The combination according to claim 16 wherein said first named means includes an electric motor, a rate generator driven by said motor and connected to said amplifier network for supplying a voltage thereto having a magnitude proportional to the rate of change of speed of said motor and a polarity determined by the direction of rotation of said motor.

18. The combination with a gas turbine engine having an exhaust opening and afterburner fuel system including a fuel control therefor, of a mechanism for varying the effective area of said opening, means for automatically controlling said mechanism, a bridge network comprising apparatus for producing a voltage in the network which reflects a maximum desired engine operating temperature, means for producing a voltage in the network which reflects actual engine temperature, and means connecting said bridge network to said first named means, the apparatus of said bridge network embracing a connection to said fuel control for scheduling fuel to the engine after said maximum engine temperature has been attained.

References Cited in the file of this patent

UNITED STATES PATENTS

| | | |
|---|---|---|
| 2,514,248 | Lombard et al. | July 4, 1950 |
| 2,551,979 | Sparrow | May 8, 1951 |

FOREIGN PATENTS

| | | |
|---|---|---|
| 626,045 | Great Britain | July 8, 1949 |